June 12, 1956  W. F. FIEDLER  2,749,638
CHRISTMAS TREE ACCESSORY
Filed June 7, 1954
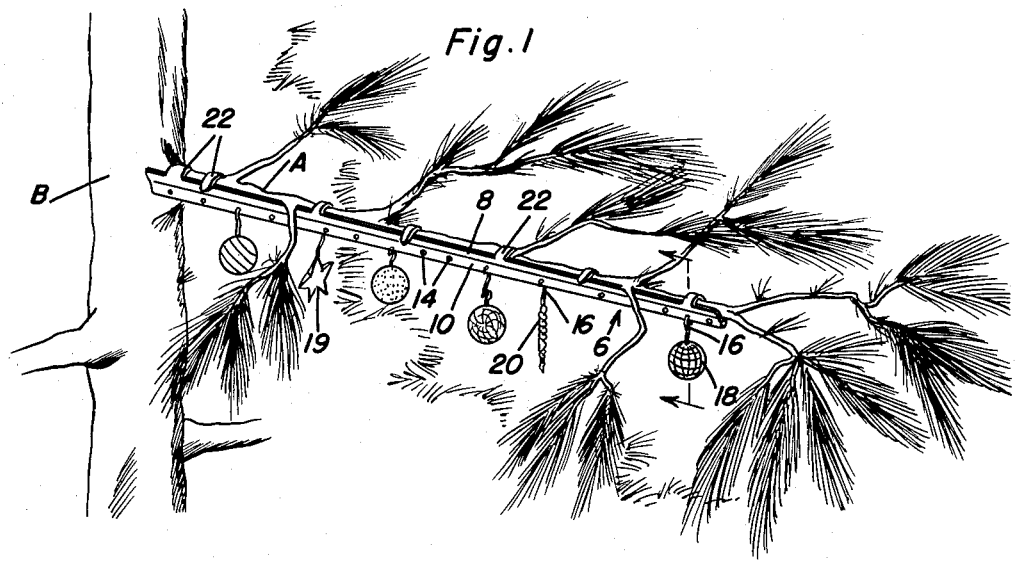
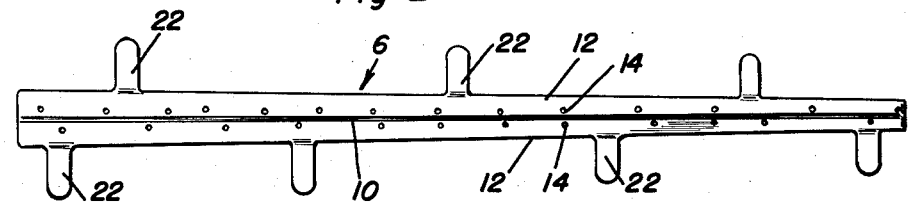
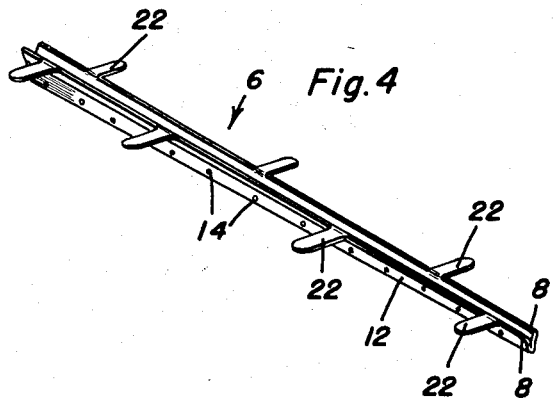
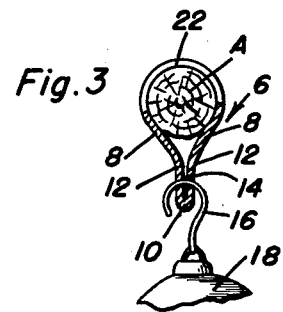
William F. Fiedler
INVENTOR.

United States Patent Office 2,749,638
Patented June 12, 1956

2,749,638

CHRISTMAS TREE ACCESSORY

William F. Fiedler, Allentown, Pa.

Application June 7, 1954, Serial No. 434,890

2 Claims. (Cl. 41—12)

The present invention relates to certain new and useful improvements in readily applicable and removable devices which are expressly designed to assist users thereof in more handily and expeditiously trimming a Christmas tree with the thought in mind that the finished job will promote the desired completeness and symmetry, and has more particular reference to a simple and economical accessory which is applicable to a selected limb of the Christmas tree.

It is a matter of common knowledge that Christmas tree limbs are often crooked, frail and limber and will droop or bend, especially at the outer free ends, and this if the attached ornaments are of any appreciable degree of weight. There exists a tendency among those who endorse well-trimmed Christmas trees to advocate the technique wherein, for the most part, the limbs can be arranged in symmetrical order requiring, of course, mechanical aids of one type or another. The instant invention appertains, therefore, to what may be broadly classified as a tree limb attachment, one which is essentially two-fold in character; namely, functions as a limb straightening and reinforcing brace and, what is just as important, as practical means to suspend balls, trinkets, and other equivalent decorating ornaments.

In carrying out a preferred embodiment of the invention there is provided a splint-like attachment which, more specifically, is a sheath for partial reception and retention of the limb, the same being substantially linearly straight and rigid and, when applied to the limb, serving to straighten the same and at the same time rigidify it for the sake of appearance and enabling the desired symmetry and orderliness factors to be attained and maintained.

Briefly, then, the subject matter of the invention has to do with a splint-like attachment for limbs on a Christmas tree which, after it is applied to a limb, braces and reinforces the limb and minimizes bending or drooping and adapts said limb to neatly support balls, trinkets, trimmings and so on with requisite nicety, and means for temporarily holding said attachment in its given position, and said attachment being linearly straight and rigid so that it permits the user to fit the limb thereto and to transform the limb in shape just in case it is crooked, so that it may be straightened out for desired symmetry of appearance.

Novelty is also predicated on the above and wherein means is embodied in the attachment to permit the latter to be handily employed as a hanger for suspension wires, hooks, clips, and the like, used in supporting balls and similar ornaments.

In carrying out a preferred embodiment of the invention, the splint is preferably formed from sheet material, light weight sheet metal, if desired, this being formed into an elongated one-piece splint which is channel-shaped in cross-section and which has handy bendable attaching and retaining fingers.

Other objects, features and advantages will become more readily apparent from the following description and the accompanying sheet of illustrative drawings.

In the drawings, wherein like numerals are employed to designate like parts throughout the same:

Figure 1 is a perspective view of a Christmas tree showing a portion of the trunk and one complete limb and illustrating the splint-like attachment, the subject matter of the invention, and the manner in which it is constructed and used in actual practice;

Figure 2 is a top plan view on a slightly larger scale showing the attachment by itself and in the form in which it is sold for use;

Figure 3 is a cross-section on the vertical line 3—3 of Figure 1 looking in the direction of the arrows; and Figure 4 is a perspective view based on the showing made in Figure 2.

Referring now to the drawings with the aid of reference numerals and lead lines, the device in the sense that it is a ready-to-use article of manufacture is here treated as a limb attachment and is denoted generally by the numeral 6. It is formed from a blank of sheet material, light metal, for example, which is bent between its ends to provide the splint-like construction. More specifically, the "splint" takes the form of an elongated linearly straight rigid sheath which is channel-shaped in cross-section. The main channel portion, seen better in Figure 3, is V-shaped and is characterized by a pair of outwardly diverging walls 8—8. The crotch portion of the channel joins with a lengthwise rib 10 which is also made up of spaced walls 12—12 which are closely spaced and which are provided with aligned holes 14 to accommodate attaching hooks 16 (wires, or the like) on the Christmas balls 18, or other tree ornaments 19 and 20. Sometimes caps with hooks are employed as suspension elements and in other instances wires are utilized for tying and twisting purposes. In any event, we have a V-shaped channel with a rib at the bottom with holes to accommodate the attaching and suspension elements and with the "channel" designed and adapted to accommodate the limb A extending out from the tree trunk B.

Although the attachment may be secured in useful position in other ways, it is preferred that the diverging side walls be provided with bendable tongues or tabs which are staggered or alternately arranged in the manner shown in Figure 2 and are denoted by the numerals 22. These can be bent and hooked over the limb thus to fasten the "channel" to the underside of the limb. The V-formation of the channel makes it possible for the same to accommodate limbs of different cross-sectional sizes, as is obvious. By fitting the limb into the channel and binding it in place with the bent-over tabs or tongues 22 it will be seen that the limb is thus aptly sheathed in place and in case it is crooked or bent in one direction or another it becomes straightened out and strengthened. With this linearly straight form and radiating from the tree usually at an upwardly inclined angle, the limb presents a highly satisfactory appearance. The depending apertured rib portion serves as hanger means for the string of ornaments and actually when the limbs, wherever necessary or desired, are fitted with these attachments, the tree trimming job becomes an easy matter. It would be possible to attach the ornaments and let them stay in position and simply unhook the bent tongues 22, and here again time would be saved in trimming the tree.

It is submitted that the tree accessory which is the subject matter of the instant presentation, is possessed of the prerequisites of novelty and great utility, that it will serve its intended purposes and constitutes that in which manufacturers and users will find their respective requirements and needs aptly and satisfactorily met.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A tree limb attachment comprising an elongate rigid sheet material member embodying a channel which is open-ended and approximately V-shaped in cross-section, and which is provided along its crotch portion with a depending rib, said rib having a plurality of longitudinally spaced holes to accommodate suspension hooks, and the side walls of the channel being provided along their free edges with bendable tongues providing attaching hooks.

2. A tree limb attachment which, after it is applied to a limb, braces and reinforces the limb and minimizes bending and rooping and shapes the limb to a desired form for purposes of effectually and symmetrically displaying and supporting various ornaments on the limb, said attachment comprising an elongate sheath generally V-shaped in cross-section and providing an open ended channel for reception of limbs of different cross-sectional dimensions, said sheath being provided along the center of its bottom with a longitudinal rib provided with a multiplicity of holes to accommodate suspension hooks or hanger wires such as are provided on the aforementioned ornaments.

References Cited in the file of this patent

UNITED STATES PATENTS

| | | |
|---|---|---|
| 1,026,969 | Tygert | May 21, 1912 |
| 1,929,317 | Kelly | Oct. 3, 1933 |
| 2,173,011 | De Meester | Sept. 12, 1939 |